United States Patent
Kropp

(10) Patent No.: US 7,668,422 B2
(45) Date of Patent: Feb. 23, 2010

(54) ARRANGEMENT FOR MULTIPLEXING AND/OR DEMULTIPLEXING OPTICAL SIGNALS HAVING A PLURALITY OF WAVELENGTHS

(75) Inventor: Jorg-Reinhardt Kropp, Berlin (DE)

(73) Assignee: Finisar Corporation, Sunnyvale, CA (US)

(*) Notice: Subject to any disclaimer, the term of this patent is extended or adjusted under 35 U.S.C. 154(b) by 58 days.

(21) Appl. No.: 10/799,437

(22) Filed: Mar. 12, 2004

(65) Prior Publication Data

US 2004/0208452 A1    Oct. 21, 2004

(30) Foreign Application Priority Data

Mar. 14, 2003    (DE) .................. 103 12 500

(51) Int. Cl.
 *G02B 6/28* (2006.01)
 *G02B 6/26* (2006.01)
 *G02B 6/42* (2006.01)
 *G02B 27/00* (2006.01)
 *H04J 3/04* (2006.01)

(52) U.S. Cl. ............... 385/47; 385/24; 385/39; 359/124; 359/577; 370/535

(58) Field of Classification Search ............. 385/24, 385/47, 39
See application file for complete search history.

(56) References Cited

U.S. PATENT DOCUMENTS

| | | | |
|---|---|---|---|
| 4,244,045 A * | 1/1981 | Nosu et al. ............ | 398/86 |
| 5,960,141 A * | 9/1999 | Sasaki et al. .......... | 385/88 |
| 6,515,766 B1 * | 2/2003 | Matama ................ | 358/1.9 |
| 6,870,976 B2 * | 3/2005 | Chen et al. ............ | 385/14 |
| 7,038,778 B2 * | 5/2006 | Yamauchi .............. | 356/419 |

FOREIGN PATENT DOCUMENTS

| | | |
|---|---|---|
| DE | 198 10 624 A1 | 9/1999 |
| DE | 199 47 889 A1 | 5/2001 |
| EP | 0877264 A2 | 11/1998 |
| EP | 1004907 A2 | 5/2000 |
| WO | WO 0102887 A1 | 1/2001 |
| WO | WO 0216987 A1 | 2/2002 |
| WO | WO 03012505 A1 | 2/2003 |

OTHER PUBLICATIONS

Merriam-Webster Online.*

* cited by examiner

*Primary Examiner*—Frank G Font
*Assistant Examiner*—Erin D Chiem
(74) *Attorney, Agent, or Firm*—Workman Nydegger

(57) ABSTRACT

An arrangement for multiplexing and/or demultiplexing optical signals having a plurality of wavelengths, including a multiplex body having two parallel surfaces between which light is reflected back and forth and in this case is coupled in or out in a wavelength-dependent manner, and structures for coupling optical signals into or out of the multiplex body. According to the invention, the structures for coupling optical signals into or out of the multiplex body have a plurality of essentially structurally identical subassemblies, each subassembly having an optoelectronic transducer and an associated optical system, by which light having a wavelength is respectively coupled into or out of the multiplex body.

18 Claims, 4 Drawing Sheets

ARRANGEMENT FOR MULTIPLEXING AND/OR DEMULTIPLEXING OPTICAL SIGNALS HAVING A PLURALITY OF WAVELENGTHS

FIELD OF THE INVENTION

The invention relates to an arrangement for multiplexing and/or demultiplexing optical signals having a plurality of wavelengths.

BACKGROUND

It is known in optical telecommunications to multiplex the data to be transmitted in order to transmit a largest possible volume of data via an optical waveguide. One possibility for this consists in transmitting information with a plurality of wavelengths independently and simultaneously via one waveguide. In this case, it is necessary, at the transmission end, to combine the signals from the various light sources by means of an optical multiplexer into an optical waveguide and, at the receiver end, to divide the signals having different wavelengths from the incoming waveguide into individual channels for separate detection by means of an optical demultiplexer.

In order to realize a multiplexing or demultiplexing, it is known from EP A 0 877 264 to separate the individual wavelengths by means of interference filters. By virtue of a high number of interference layers, the interference filters generate very steep spectral edges between transmission and reflection of different wavelengths. Only a specific wavelength is transmitted by the interference filters in this case, while the other wavelengths are reflected. By cascading such filters with individually different spectral transmission positions, it is possible to effect a selection or combination of a multiplicity of wavelength channels. The use of interference filters is extremely effective particularly in the case of relatively large wavelength separations of 10 nm or more between the individual channels.

WO 02/16987 A1 describes an optoelectronic assembly for multiplexing and/or demultiplexing optical signals having a monolithic multiplex body and two optical imaging systems for coupling light beams into or out of the multiplex body. A parallel light beam which enters the multiplex body at an acute angle via a single-channel interface body is multiply reflected back and forth between the two parallel surfaces, the light beam being coupled out at wavelength-selective mirror areas in each case with a wavelength component.

WO 03/012505 A1 discloses an apparatus for multiplexing and/or demultiplexing optical signals having a plurality of wavelengths, in which optical signals in waveguides impinge on a wavelength-selective filter in each case at different angles, optical signals having only a specific wavelength being coupled in or out for each angle.

EP 1 004 907 A2 and WO 01/02887 A1 disclose using a common body having a plurality of lenses for coupling in and out parallel beams having a different wavelength. As a result, a reduction of the parts is achieved, but a very high precision must be ensured. Moreover, components having the high complexity required can only be produced in plastic, so that the properties of the plastics used, such as the thermal and optical behavior thereof, limit the practical applications.

SUMMARY OF THE INVENTION

The present invention provides an arrangement for multiplexing and/or demultiplexing optical signals having a plurality of wavelengths which has a simple and compact construction and at the same time can be produced cost-effectively.

Accordingly, the solution according to the invention includes a plurality of essentially structurally identical subassemblies, each having an optoelectronic transducer and an associated optical system, by means of which light having a wavelength is respectively coupled into or out of a multiplex body.

A flexible modular system that is simple to construct is provided through the use of essentially structurally identical subassemblies. The subassemblies can be made small and produced in a cost-effective manner by means of methods such as are known from the packaging of electronic assemblies.

If the optoelectronic transducers of the subassemblies are in each case designed as a transmission component, the subassemblies differ from one another preferably solely by the wavelength of the light emitted by the respective transmission component. If the optoelectronic transducers of the subassemblies are in each case designed as a reception component, the subassemblies are preferably completely structurally identical. Cost-effective multiplex arrangements can be provided through the use of a multiplicity of identical or essentially identical subassemblies.

In a preferred refinement of the invention, the optical system of the subassemblies is designed in such a way that the subassemblies in each case provide an optical path comprising a parallel beam pencil. As a result, a parallel beam path can be realized in the multiplex body without further measures.

The subassemblies are preferably in each case mechanically connected to the multiplex body. However, a positioning with respect to one another may also be effected in a different way, for instance by means of separate holding elements.

In a preferred design of the invention, provision is made of means which in each case provide an angular orientation of the optical path of a subassembly with respect to the surface of the multiplex body. These means preferably comprise spacers, which are in each case arranged between a subassembly and a surface of the multiplex body. In particular, each subassembly is preferably assigned an eccentrically arranged spacer, which provides a tilted arrangement of the subassembly with respect to the surface of the multiplex body, so that optical signals of the optical path are coupled in or out obliquely with respect to the surface of the multiplex body. The spacers make it possible, in a simple manner, to suitably orient the subassembly with respect to the multiplex body.

In a preferred development, the spacers are in each case premounted on the subassembly, so that it is possible to effect a simple mounting in a defined orientation on the multiplex body. Furthermore, it may be provided as an alternative that the spacers are formed as an integrated part of the subassembly. They are formed for example by a bevel of a substrate of the subassembly, said substrate facing the multiplex body. In a further alternative refinement, a plurality of spacers are connected to one another with a defined spacing and the spacers form a placement part that can be placed onto one surface of the multiplex body. The spacers thus form a type of comb or web. The advantage resides in the fact that not every spacer has to be separately fixed to the multiplex body. Instead, the placement part is placed onto the multiplex body and fixed and the individual subassemblies are subsequently placed onto the insertion part, the desired inclination in each case being produced by the individual spacers of the placement part.

Preferably, wavelength-selective filters assigned in each case to an optical path are provided on at least one surface of the multiplex body, each wavelength-selective filter being assigned a subassembly. By way of example, the wavelength-selective filters are realized on separate carrier parts arranged on the surface of the multiplex body and between multiplex body and subassembly. In principle, the filters may also be applied directly to the multiplex body.

The wavelength-selective filters and assigned subassemblies are preferably all arranged on the same surface of the multiplex body. The opposite parallel surface of the multiplex body is then provided with a broadband reflection layer, which reflects all the wavelengths involved. In principle, however, the wavelength-selective filters and assigned subassemblies may be arranged on both parallel surfaces. The broadband reflection regions are then likewise found on both parallel surfaces of the multiplex body and are formed with a small area.

The subassemblies preferably have a planar microlens formed on or in a substrate, the optoelectronic transducer being mounted on the rear side of said substrate. This results in a compact and small arrangement. Instead of a planar microlens, it is also possible, of course, to use a different lens such as, for instance, a graded-index lens (GRIN).

The subassembly preferably has a monitor diode coupled to an optical transducer designed as a transmission component. By way of example, the monitor diode is arranged on the rear side of a transmission component.

By way of example, the optoelectronic transducer and the associated optical system of a subassembly are mounted on a leadframe. For protection against external influences, the optoelectronic transducer, the associated optical system and the leadframe may be encapsulated with a potting compound.

A separate coupling assembly is provided on one of the parallel surfaces of the multiplex body for the purpose of coupling in or out the superposed optical signals having a plurality of wavelengths. The separate coupling assembly preferably has a lens for focusing the parallel beam of the superposed optical signals onto the core of an optical waveguide that is to be coupled to the coupling assembly. In addition, the coupling assembly preferably has means for guiding and fixing an optical waveguide to the coupling assembly, in particular a plug receptacle for coupling an optical plug.

BRIEF DESCRIPTION OF THE DRAWINGS

The invention is explained in more detail below using a plurality of exemplary embodiments with reference to the figures of the drawings, in which.

DETAILED DESCRIPTION OF THE PREFERRED EMBODIMENT

Figure 1:
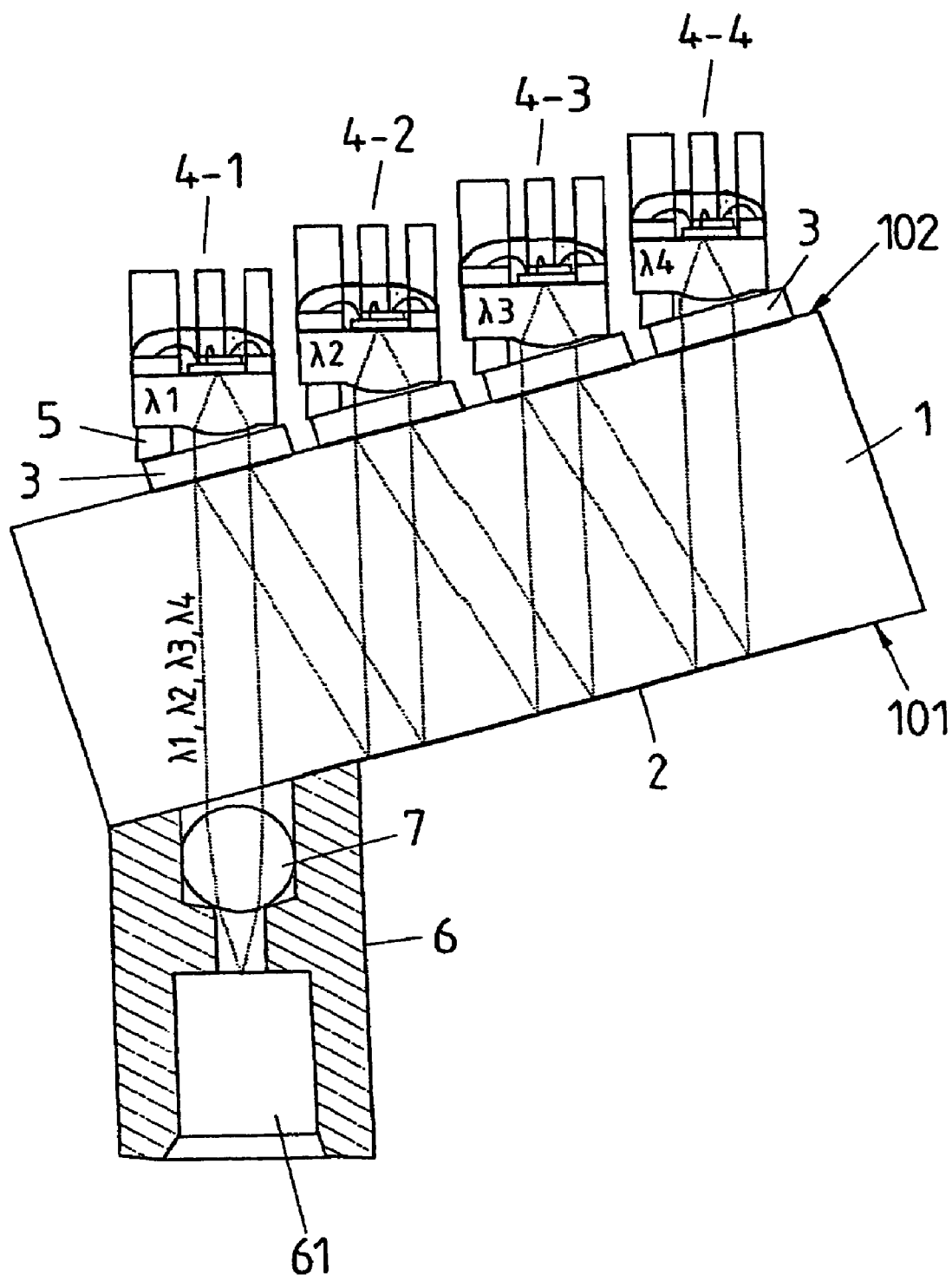
FIGS. 1 and 6 show a partly sectional view of a multiplex arrangement with a multiplex body and a multiplicity of essentially identical subassemblies.

FIG. 1 shows the basic construction of an arrangement for multiplexing and/or demultiplexing optical signals.

A monolithic multiplex body 1 is provided, which comprises a transparent material, for instance glass or plastic. The multiplex body 1 has two parallel planar surfaces 101, 102. One surface 101 is provided with a broadband reflection layer 2 over a large area. On the surface 102 parallel thereto, a plurality of wavelength-selective filters 3 are arranged one next to the other. The wavelength-selective filters are in each case formed on separate carriers 3 placed onto the surface 102 of the multiplex body 1. In principle, however, the individual filters 3 may also be applied directly to the multiplex body 1. However, such a configuration is relatively costly in production on account of the high requirements made of the quality of the individual filters.

In order to couple in or out light signals in each case having a specific wavelength or a narrowband wavelength range which represents an optical data channel $\lambda 1$, $\lambda 2$, $\lambda 3$, $\lambda 4$, a multiplicity of essentially structurally identical subassemblies 4-1, ... 4-4 are arranged on one surface 102 of the multiplex body 1. In this case, a subassembly 4 is respectively assigned to an optical channel and a wavelength-selective filter 3.

Figure 3:
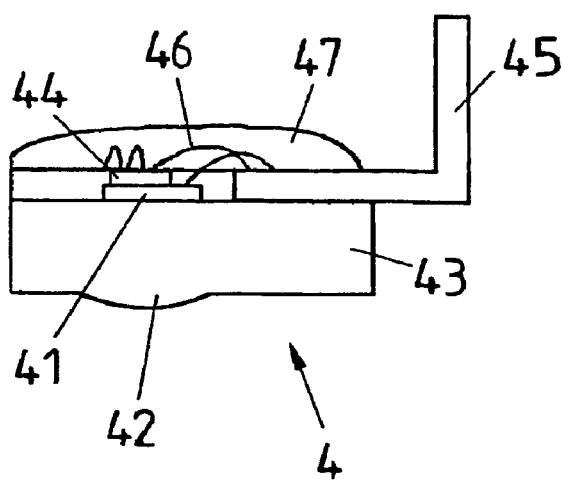
FIG. 3 shows a side view of a subassembly in accordance with FIGS. 1 and 2.
Figure 4:
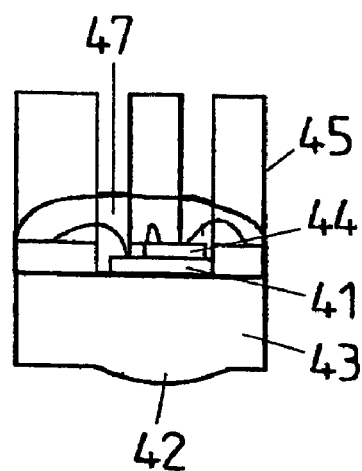
FIG. 4 shows a front view of the subassembly of FIG. 3.
Figure 5:
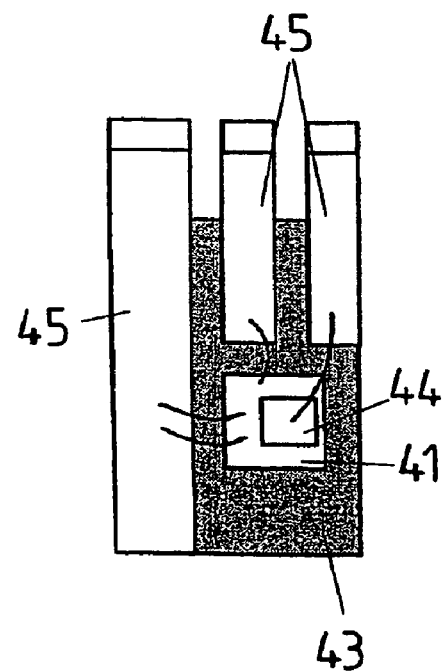
FIG. 5 shows a plan view of the subassembly of FIGS. 3 and 4.

A subassembly 4 is illustrated in detail in FIGS. 3 to 5. Accordingly, each subassembly 4 has an optical transducer 41, which may be a transmission component such as a laser diode or a reception component such as a photodiode. The transducer 41 is assigned a coupling optical system 42, which is designed in such a way that the optical path of the subassembly provides a parallel beam pencil, i.e. light emitted by a transmission component is shaped into a parallel beam pencil or a received parallel beam pencil is imaged onto the light-sensitive area of a reception component.

In the exemplary embodiment illustrated, the coupling optical system is formed by a microlens 42 formed on or in a planar substrate 43, the transducer 41 being mounted on the rear side of said microlens. A particularly compact arrangement is provided as a result of this.

In the exemplary embodiment illustrated, the transducer 41 is a vertically emitting laser diode which radiates directly into the substrate 43. However, it is equally possible to use edge-emitting lasers with a deflection optical system. A monitor diode chip 44 is placed directly on the rear side of the chip 41 with the laser diode, and detects a rearward emitted fraction of the laser light. Furthermore, a leadframe 45 is provided, via which the laser diode 41 and the monitor diode 44 are contact-connected by means of bonding wires 46.

If the transducer is a reception component, a corresponding construction is present.

The subassembly 4 can be dimensioned to be very small and be produced in a simple manner, in particular using automatic processes known from the encapsulation of electronic components.

In the case of transmission components as transducer 41, the individual subassemblies differ solely by the wavelength of the individual transmission components. In the case of reception components as transducer 41, the receiver assemblies may be completely identical if the reception components are sensitive to all the wavelengths used.

Figure 2:
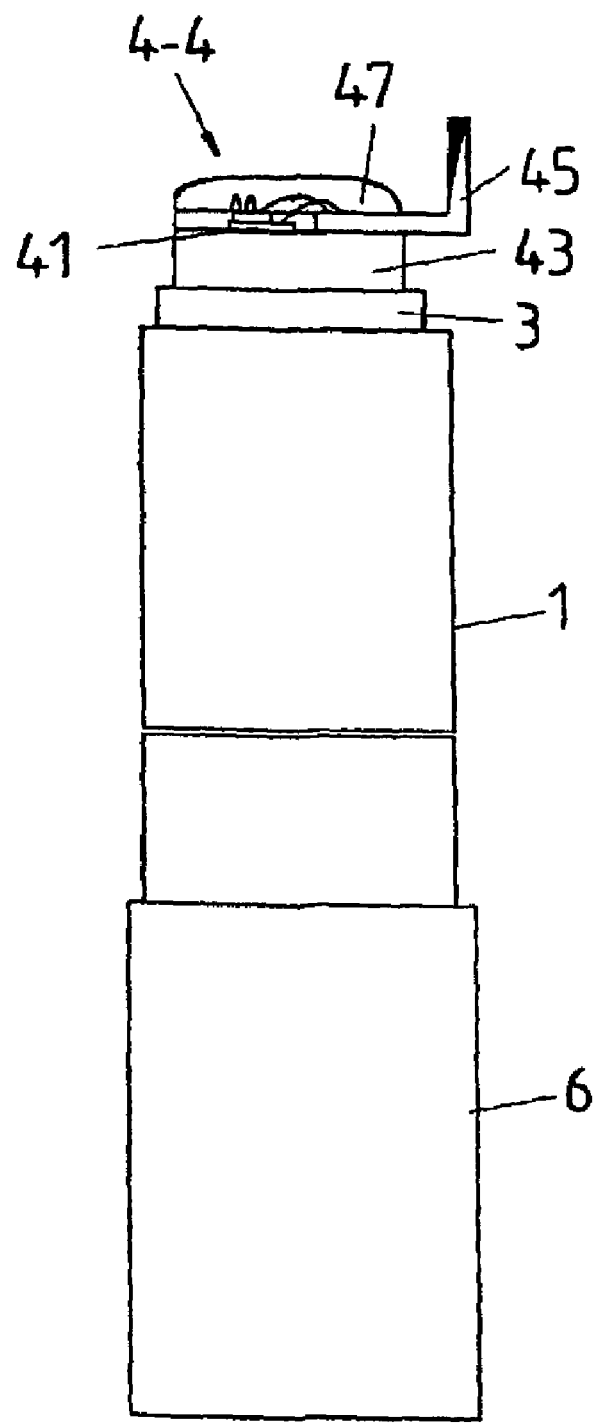
FIG. 2 shows a side view of the arrangement of FIG. 1.

FIGS. 1 and 2 will now be considered again. In order that the light which is emitted or received perpendicularly by the respective subassembly 4 is coupled into or out of the multiplex body 1 in an angled manner (that is to say at an angle not equal to 90° with respect to the surface), so that the light can be reflected back and forth between the two surfaces 101, 102, the subassembly 4 is fitted on the multiplex body 1 using an eccentrically arranged spacer 5, by means of which the subassembly 4 and thus the optical axis thereof is tilted with respect to the assigned surface 102 of the multiplex body.

In this case, a spacer 5 is arranged on the subassembly on one side next to the lens 41 of the subassembly 4. As illustrated, this leads to a tilted arrangement.

Arranged on the other surface 101 of the multiplex body 1 is a separate coupling assembly 6 with a lens 7, by means of which the light beam is focused onto the core of a coupled waveguide. In order to couple such a waveguide to the coupling assembly 6, the latter forms a plug receptacle 61. The light is coupled into or out of the multiplex body 1 likewise obliquely via the coupling assembly 6.

During operation, the wavelength-selectively coupled-in light signals having the individual wavelengths λ1, λ2, λ3, λ4 are superposed in the multiplex body 1, reflection always being effected at the broadband reflection layer 2, so that the light is guided in zigzag fashion in the multiplex body 1. The superposed wavelengths are coupled out through the optical imaging system 6. If the subassemblies detect light, the beam path is opposite, light having a specific wavelength λ1, λ2, λ3, λ4 or a specific channel being coupled out of the multiplex body 1 at each wavelength-selective filter 3.

Figure 6:
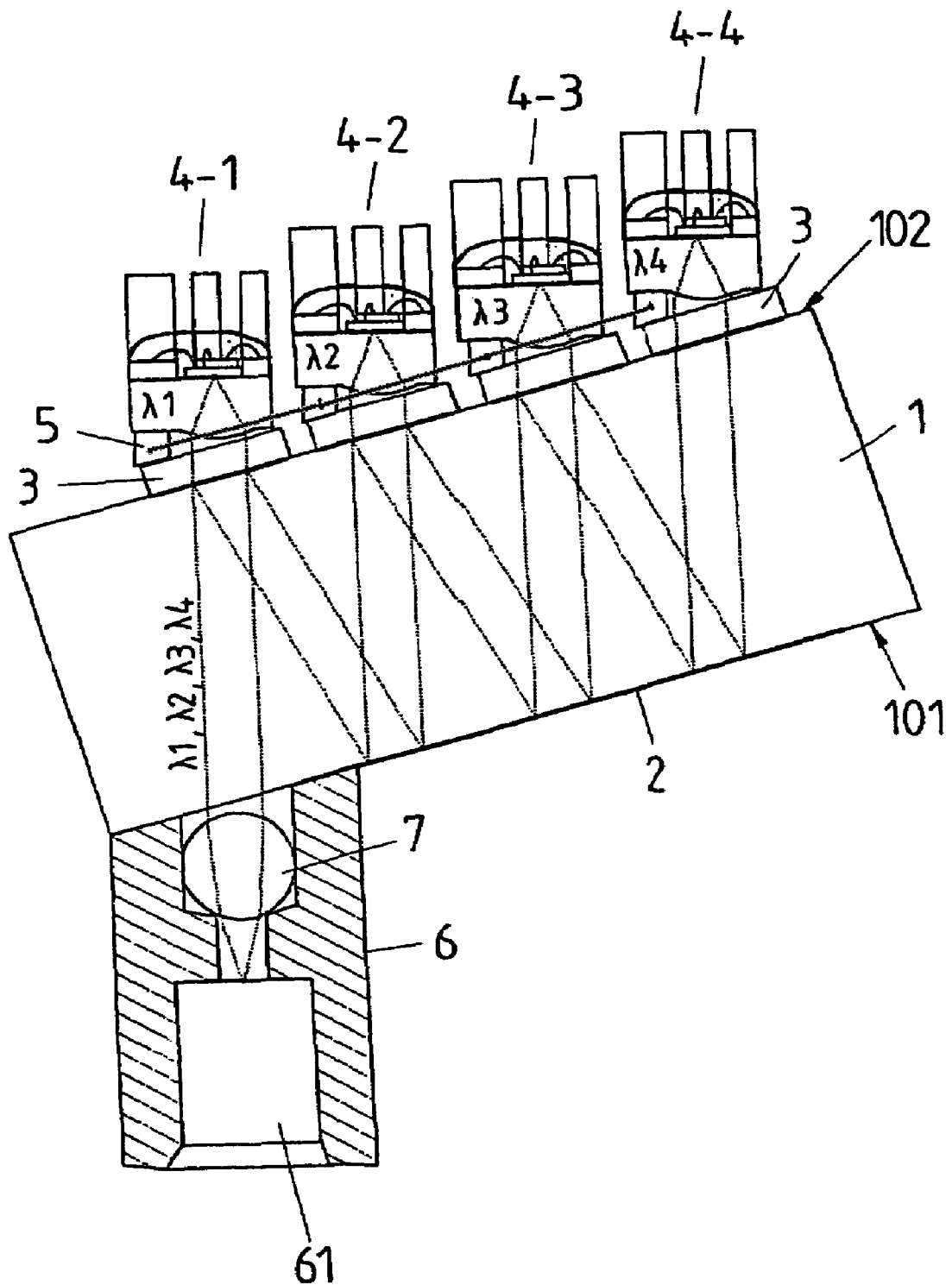

The embodiment of the invention is not restricted to the exemplary embodiments presented above. By way of example, the spacers 5 may in each case be concomitantly integrated into the subassembly 4, for instance into the substrate 43. In this case, it may also be provided that the substrate 43 runs obliquely at the side facing the multiplex body 1 and directly adjoins the multiplex body 1 or the filters 3. Moreover, as shown in FIG. 6, a plurality of spacers 5 may be connected to one another and premounted jointly on the multiplex body 1.

All that is essential to the invention is the use of structurally identical or essentially structural identical subassemblies with a transducer and assigned optical system in conjunction with a multiplex body for wavelength multiplexing. In this case, the subassemblies are produced separately, in particular in a cost-effective manner using methods such as are known from the packaging of electronic assemblies.

I claim:

1. An apparatus for multiplexing and/or demultiplexing optical signals having a plurality of wavelengths, the apparatus comprising:
   a multiplex body having first and second parallel surfaces between which light is reflected back and forth and coupled in or out in a wavelength-dependent manner;
   a first subassembly including a first optoelectronic transducer on a first side of a first substrate and an associated optical system having a first lens in a second side of the first substrate; and
   a second subassembly including a second optoelectronic transducer on a first side of a second substrate and an associated optical system having a second lens in a second side of the second substrate; and
   means for providing an angular orientation of the optical path of each subassembly with respect to the second surface of the multiplex body, wherein the means for providing the angular orientation comprises spacers, each spacer being arranged between an associated subassembly and the second surface of the multiplex body, wherein the spacers are connected to one another with a defined spacing and form a placement part that is placed onto the second surface of the multiplex body.

2. The apparatus as claimed in claim 1, wherein the optical systems of the subassemblies are formed such that each subassembly provides an optical path comprising a parallel beam pencil.

3. The apparatus as claimed in claim 1, wherein each subassembly is mechanically connected to the multiplex body.

4. The apparatus as claimed in claim 1, wherein each subassembly is assigned an eccentrically arranged spacer, which provides a tilted arrangement of the subassembly with respect to the second surface of the multiplex body such that optical signals of the optical path are coupled in or out obliquely with respect to the second surface of the multiplex body.

5. The apparatus as claimed in claim 1, wherein each spacer is premounted on its associated subassembly.

6. The apparatus as claimed in claim 1, wherein each spacer is formed as an integrated part of its associated subassembly.

7. The apparatus as claimed in claim 1, further comprising wavelength-selective filters, each wavelength-selective filter being assigned to an optical path and being provided on at least one of the first and second surfaces of the multiplex body, wherein each wavelength-selective filter is assigned to an associated subassembly.

8. The apparatus as claimed in claim 7, wherein the wavelength-selective filters are separate carrier parts arranged on the second surface of the multiplex body and between multiplex body and the associated subassembly.

9. The apparatus as claimed in claim 7, wherein the wavelength-selective filters and assigned subassemblies are arranged on the second surface of the multiplex body.

10. The apparatus as claimed in claim 9, wherein the first surface of the multiplex body is provided with a broadband reflection layer, which reflects all optical signal wavelengths.

11. The apparatus as claimed in claim 1, wherein each subassembly includes a monitor diode optically coupled to the optoelectronic transducer of that subassembly.

12. The apparatus as claimed in claim 1, wherein the optoelectronic transducer and the associated optical system of each subassembly are mounted on a leadframe.

13. The apparatus as claimed in claim 12, wherein the optoelectronic transducer, the associated optical system and the leadframe of each subassembly are at least partially encapsulated with a potting compound.

14. The apparatus as claimed in claim 1, wherein the optoelectronic transducer of each subassembly comprises a transmission component, and each subassembly differs from the other subassemblies with respect to the wavelength of the light emitted by the transmission component of the respective subassembly.

15. The apparatus as claimed in claim 1, wherein the optoelectronic transducer of each subassembly comprises a reception component.

16. The apparatus as claimed in claim 1, further comprising a separate coupling assembly provided on the first surface of the multiplex body.

17. The apparatus as claimed in claim 16, wherein the separate coupling assembly has a lens that focuses the optical signals within the multiplex body onto a core of an optical waveguide that is coupled to the coupling assembly.

18. The apparatus as claimed in claim 16, wherein the separate coupling assembly has means for guiding and fixing an optical waveguide to the coupling assembly.

* * * * *